United States Patent
Wuzik et al.

(10) Patent No.: US 7,060,124 B2
(45) Date of Patent: Jun. 13, 2006

(54) DYE COMBINATION

(75) Inventors: Andreas Wuzik, Untermeitingen (DE); Josef Geisenberger, Sulzbach (DE); Heidemarie Menzel, Bad Soden (DE)

(73) Assignee: Clariant GmbH, Frankfurt (DE)

( * ) Notice: Subject to any disclaimer, the term of this patent is extended or adjusted under 35 U.S.C. 154(b) by 161 days.

(21) Appl. No.: 10/478,424

(22) PCT Filed: Jul. 5, 2002

(86) PCT No.: PCT/EP02/05009

§ 371 (c)(1),
(2), (4) Date: Nov. 21, 2003

(87) PCT Pub. No.: WO02/094943

PCT Pub. Date: Nov. 28, 2002

(65) Prior Publication Data

US 2004/0128775 A1    Jul. 8, 2004

(30) Foreign Application Priority Data

May 23, 2001   (DE) ................................ 101 25 274

(51) Int. Cl.
C09D 11/02 (2006.01)
C09B 67/00 (2006.01)

(52) U.S. Cl. ................ 106/31.51; 106/31.46; 106/31.48; 106/31.5; 106/31.52; 8/641

(58) Field of Classification Search ............ 106/31.51, 106/31.52, 31.46, 31.48, 31.5; 8/583, 641
See application file for complete search history.

(56) References Cited

U.S. PATENT DOCUMENTS

| | | | |
|---|---|---|---|
| 4,737,240 A * | 4/1988 | Davis et al. ............... 162/162 |
| 5,053,495 A | 10/1991 | Greenwood et al. ........ 534/829 |
| 5,597,903 A | 1/1997 | Gisler ........................ 534/637 |
| 5,654,410 A | 8/1997 | Nusser et al. ............... 534/634 |
| 5,938,827 A * | 8/1999 | Breton et al. ............ 106/31.43 |
| 6,265,554 B1 * | 7/2001 | Lehmann et al. .......... 534/629 |
| 6,464,768 B1 | 10/2002 | Bauer et al. ............. 106/31.52 |
| 6,596,067 B1 | 7/2003 | Menzel et al. ........... 106/31.51 |
| 6,749,674 B1 | 6/2004 | Geisenberger et al. ... 106/31.52 |
| 6,843,838 B1 * | 1/2005 | Zimmer et al. .......... 106/31.27 |
| 2001/0027734 A1 | 10/2001 | Geisenberger et al. ... 106/31.52 |
| 2004/0074018 A1 | 4/2004 | Wuzik et al. ............ 106/31.51 |
| 2005/0087100 A1 * | 4/2005 | Blease et al. ............ 106/31.47 |

FOREIGN PATENT DOCUMENTS

| | | |
|---|---|---|
| DE | 19831095 | 1/2000 |
| EP | 0539178 | * 4/1993 |
| GB | 2332439 | 6/1999 |
| WO | WO 01/72906 | 10/2001 |

OTHER PUBLICATIONS

English Abstract for JP 59093766, May 30, 1984.
P. Gregory, Topics in Applied Chemistry: High Technology applications of Organic Colorants Ch. 2 Micro Color Filters, Plenum Press, New York, pp. 15-25; 1991, no month available.

* cited by examiner

*Primary Examiner*—Helene Klemanski
(74) *Attorney, Agent, or Firm*—Anthony A. Bisulca

(57) ABSTRACT

The invention relates to a dye mixture consisting essentially of one dye of formula (4) and a dye of formula (5). The black dye mixture is advantageously used for ink jet printing and provides high light-resisting and neutral black ink formulations

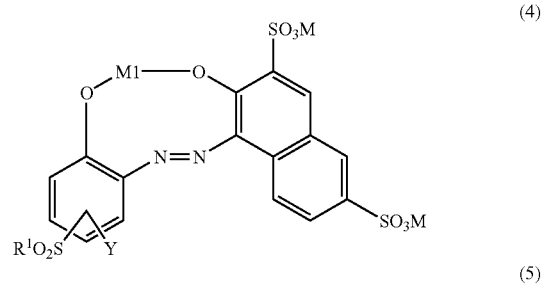

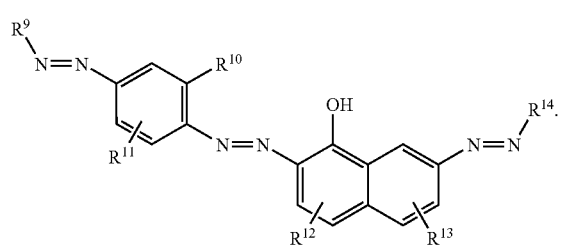

19 Claims, No Drawings

DYE COMBINATION

The invention relates to the field of colorants, particularly for use in recording liquids for writing and recording apparatus, for inkjet printing processes, for example.

The inkjet process is a contactless printing process in which droplets of the recording liquid are guided from one or more nozzles onto the substrate that is to be printed. In order to obtain prints of high definition and resolution, the recording liquids and the colorants present therein are required to meet stringent requirements, particularly in terms of purity, freedom from particles, solubility, stability on storage, viscosity, surface tension, and conductivity. Very stringent requirements are imposed in particular on color strength, shade, brilliance and fastness properties such as light fastness, water fastness, and rub fastness. High light fastness in particular is of great importance for exterior inkjet applications and for the production of inkjet prints with photographic quality.

The most important role is accorded the dyes that are used in the inks. Although a large number of dyes have been developed, there are only a few which meet the requirements a modern inkjet printing process imposes on them.

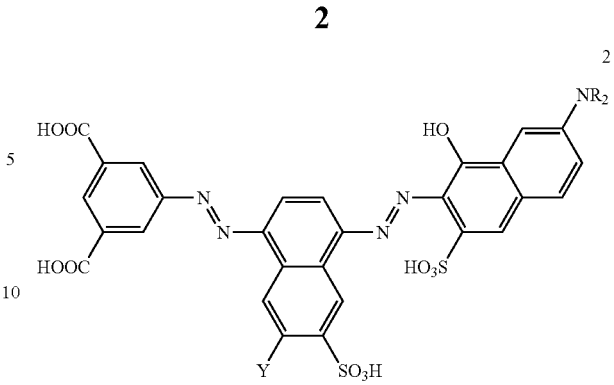

Although the introduction of the carboxyl groups achieved improved water fastness, there was at the same time a deterioration in the abrasion resistance, attributed to the fact that, owing to the formation of aggregates, the dye molecules were no longer (or not to any more than a very small extent) able to penetrate the recording medium.

In order to achieve increased light fastness, metal complexes of disazo and tetraazo dyes such as, for example, C.I. Direct Black 62 of the formula (3) were used (DE-A-198 31 095).

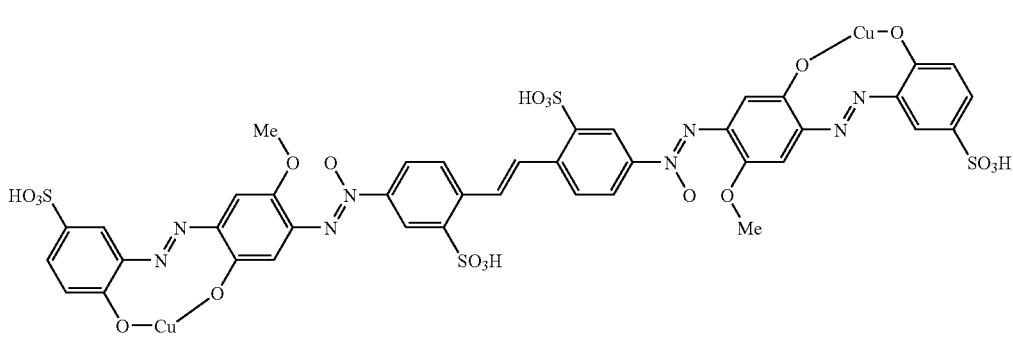

To start with, traditional dyes from the food, textile, and paper segments were used, which were then specially modified for inkjet application. By way of example, consider the food dye C.I. Food Black 2 of the formula (1), which alongside structurally similar compounds was used as a black dye in inks (JP 59-093,766).

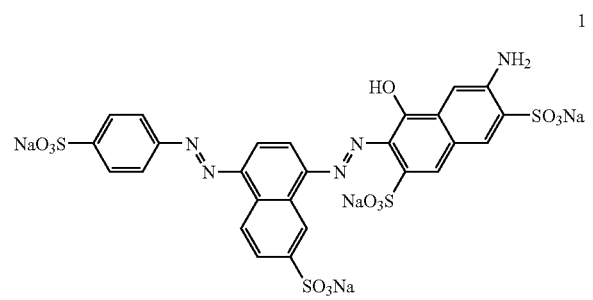

The prints obtained do not appear jet black, however, but rather bluish black. Moreover, the light fastnesses are unsatisfactory. In order to minimize the disadvantages, the substituents of C.I. Food Black 2 were varied to give black dyes of the formula (2), which show a more neutral black shade and possess increased water fastness (U.S. Pat. No. 5,053,495).

Although the fastness properties were improved, the dye (3) does not meet all of the requirements. For example, it possesses not only a low stability on storage but also an inadequate solubility in the application medium.

There is therefore a need for improved recording liquids which are superior, particularly in shade and light fastness, to the existing black inks and which at the same time have the other properties required for the inkjet sector.

Another object of the invention is to provide a highly light-stable and neutral-black ink formulation.

It has surprisingly been found that the requirements imposed can be met by using the dye mixtures defined hereinbelow.

The present invention provides dye mixtures consisting essentially of one or more dyes of the formula (4) and one or more dyes of the formula (5)

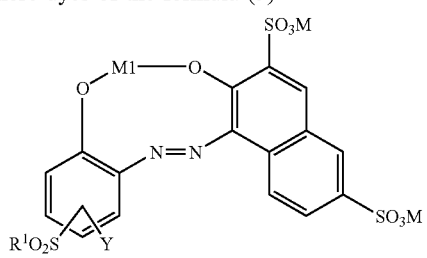

-continued

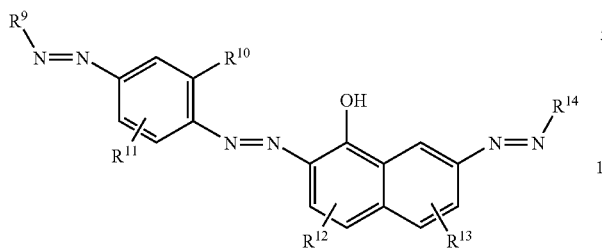

in which
Y is H, $(C_1–C_6)$-alkyl, $(C_1–C_6)$-alkoxy or halogen;
$R^1$ is OM, CH=CH$_2$, CH$_2$CH$_2$OR$^2$, CH$_2$CH$_2$NR$^3$R$^4$, CH$_2$CH$_2$SR$^5$ or CH$_2$CH$_2$CR$^6$R$^7$R$^8$,
$R^2$ is H, SO$_3$M, $(C_1–C_6)$-alkyl, branched or unbranched $(C_1–C_6)$-alkyl substituted by one or more, for example, 1, 2 or 3, radicals from the group consisting of OH, NH$_2$, COOM and SO$_3$M; $(C_1–C_6)$-acyl, $(C_6–C_{10})$-aryl, $(C_6–C_{10})$-aryl substituted by one or more, for example, 1, 2 or 3, radicals from the group consisting of halogen, OH, NH$_2$, COOM and SO$_3$M; or 5–10-membered heterocycles containing from 1 to 4 heteroatoms from the group consisting of O, N and S;
$R^3$ and $R^4$ independently of one another are H, $(C_1–C_6)$-alkyl, $(C_1–C_6)$-alkyl substituted by one or more, for example, 1, 2 or 3, radicals from the group consisting of OH, NH$_2$, COOM and SO$_3$M; $(C_1–C_6)$-acyl, $(C_6–C_{10})$-aryl, $(C_6–C_{10})$-aryl substituted by one or more, for example, 1, 2 or 3, radicals from the group consisting of OH, halogen, NH$_2$, COOM and SO$_3$M; or NR$^3$R$^4$ forms a heterocycle;
$R^5$ is $(C_1–C_6)$-alkyl, branched or unbranched $(C_1–C_6)$-alkyl substituted by one or more, for example, 1, 2 or 3, radicals from the group consisting of OH, NH$_2$, COOM and SO$_3$M; $(C_1–C_6)$-acyl, $(C_6–C_{10})$-aryl, $(C_6–C_{10})$-aryl substituted by one or more, for example 1, 2 or 3, radicals from the group consisting of OH, halogen, NH$_2$, COOM and SO$_3$M, or SR$^5$ forms a heterocycle;
$R^6$, $R^7$, and $R^8$ independently of one another are H, $(C_1–C_6)$-alkyl, or $(C_1–C_6)$-alkyl substituted by one or more, for example, 1, 2 or 3, radicals from the group consisting of halogen, OM, NH$_2$, COOCH$_3$, COOM and SO$_3$M; or one or two of the radicals $R^6$, $R^7$, and $R^8$ is or are COOM;
$R^9$ is a $(C_6–C_{14})$-aryl radical substituted one or more times, e.g. 2, 3, 4 or 5 times, by OM, O$(C_1–C_6)$-alkyl, O$(C_1–C_6)$-alkyl-COOM, O$(C_1–C_6)$-alkyl-SO$_3$M, O(hydroxy$(C_1–C_6)$-alkyl), $(C_1–C_6)$-alkyl, COOM, SO$_3$M, SO$_2$NH$_2$, SO$_2$N(hydroxy$(C_1–C_6)$-alkyl)$_2$, SO$_2$NH$(C_1–C_6)$-alkyl, SO$_2$N$((C_1–C_6)$-alkyl)$_2$, NH$_2$, NH$(C_1–C_6)$-alkyl, NH$(C_1–C_6)$-acyl, NH$(C_6–C_{10})$-aryl, N(hydroxy$(C_1–C_6)$-alkyl)$_2$, N$((C_1–C_6)$-alkyl)$_2$ and/or halogen;
$R^{10}$ is OM, O$(C_1–C_6)$-alkyl, COOM, SO$_3$M, COO$(C_1–C_6$-alkyl) or SO$_3$$(C_1–C_6$-alkyl);
$R^{11}$, $R^{12}$, and $R^{13}$ are identical or different and are H, OM, O$(C_1–C_6)$-alkyl, O$(C_1–C_6)$-alkyl-COOM, O$(C_1–C_6)$-alkyl-SO$_3$M, O(hydroxy$(C_1–C_6)$-alkyl), $(C_1–C_6)$-alkyl, COOM, SO$_3$M, SO$_2$NH$_2$, SO$_2$N(hydroxy$(C_1–C_6)$-alkyl)$_2$, SO$_2$NH$(C_1–C_6)$-alkyl, SO$_2$N$((C_1–C_6)$-alkyl)$_2$, NH$_2$, NH$(C_1–C_6)$-alkyl,NHacyl, NH$(C_6–C_{14})$-aryl, N(hydroxy$(C_1–C_6)$-alkyl)$_2$, N$((C_1–C_6)$-alkyl)$_2$, or halogen;
$R^{14}$ is a monocyclic or bicyclic, carbocyclic or heterocyclic, aromatic or aliphatic ring which is unsubstituted or substituted one or more times, e.g. 2, 3, 4 or 5 times, by OM, O$(C_1–C_6)$-alkyl, O$(C_1–C_6)$-alkyl-COOM, O$(C_1–C_6)$-alkyl-SO$_3$M, O(hydroxy$(C_1–C_6)$-alkyl), $(C_1–C_6)$-alkyl, COOM, SO$_3$M, SO$_2$NH$_2$, CONH-phenyl, SO$_2$NH-phenyl, SO$_2$N(hydroxy$(C_1–C_6)$-alkyl)$_2$, SO$_2$NH$(C_1–C_6)$-alkyl, SO$_2$N$((C_1–C_6)$-alkyl)$_2$, NH$_2$, NH$(C_1–C_6)$-alkyl, NH$(C_1–C_6)$-acyl, NH$(C_6–C_{10})$-aryl, N(hydroxy$(C_1–C_6)$-alkyl)$_2$, N$((C_1–C_6)$-alkyl)$_2$, halogen and/or phenylsulfo and can contain 1, 2 or 3 of the heteroatoms N, O and/or S in the ring;
M1 stands for monovalent or polyvalent metal atoms, such as Cu, Co, Ni, Fe, Cr or ⅔ Al; and
M is hydrogen, a monovalent metal cation, one equivalent of a polyvalent metal cation, or an ammonium ion unsubstituted or substituted by $(C_1–C_4)$-alkyl, $(C_1–C_4)$-alkoxy-$(C_1–C_4)$-alkyl, hydroxy-$(C_1–C_4)$-alkyl, benzyl or $(C_6–C_{10})$-aryl.

M1 is preferably Cu.
M is preferably hydrogen, sodium, lithium or potassium.
Y is preferably hydrogen, methyl, ethyl, methoxy or ethoxy.
Halogen is preferably chlorine or bromine.
$R^1$ is preferably OH, CH=CH$_2$, CH$_2$CH$_2$OR$^2$ or CH$_2$CH$_2$NR$^3$R$^4$.
$R^2$ is preferably hydrogen, SO$_3$M, methyl, ethyl, acetyl, phenyl, chlorophenyl, phenylsulfonic acid, morpholinyl or pyridinyl.
$R^3$ and $R^4$ are preferably hydrogen, methyl, ethyl, hydroxymethyl, hydroxypropyl, acetyl, phenyl, chlorophenyl, phenylsulfonic acid, CH$_2$CH$_2$OM, CH$_2$CH$_2$SO$_3$M, CH$_2$COOH, CH$_2$CH$_2$COOM or CH$_3$CHCOOM.
$R^5$ is preferably methyl, ethyl, propyl, butyl, phenyl, CH$_2$CH$_2$CH$_2$SO$_3$M or CH$_2$CH$_2$COOM.
$R^6$, $R^7$, and $R^8$ are preferably hydrogen, methyl, ethyl, CH$_2$CH$_2$OH, CH$_2$CH$_2$NH$_2$, or $R^6$ and/or $R^7$ are COOM.
$R^9$ is preferably a phenyl or naphthyl radical substituted 1, 2, or 3 times by OH, O$(C_1–C_6)$-alkyl, COOM, SO$_3$M and/or NH$_2$.
$R^{11}$ is preferably H, methyl or O$(C_1–C_6)$-alkyl.
$R^{12}$ and $R^{13}$ are preferably H, COOM or SO$_3$M.
$R^{14}$ is preferably a phenyl, naphthyl, pyridyl, pyridonyl or pyrazolyl radical substituted 1, 2 or 3 times by OH, O$(C_1–C_6)$-alkyl, COOM, SO$_3$M, NH$_2$, NH$(C_6–C_{10})$-aryl, NH$(C_1–C_6)$-acyl and/or phenylsulfo.
M is preferably H, Na, K, Li, Ca/2 or ammonium.

In the dyes of the formula (5) the metal atom is attached preferably as shown in formula (5a)

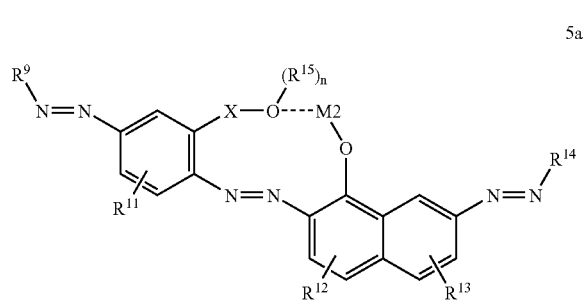

in which
M2 is preferably ⅔ Al, Cr, Fe, Co, Ni or Cu, especially Cu,
$R^{15}$ is $C_1–C_6$-alkyl,
n is 0 or 1, and X is a chemical bond, —CO— or —SO$_2$— and R$^9$, R$^{11}$, R$^{12}$, R$^{13}$, R$^{14}$, and M have the preferred definitions stated above.
Particularly preferred dyes of the formula (5) are the dyes described in DE-A-100 15 004, of the following formulae:
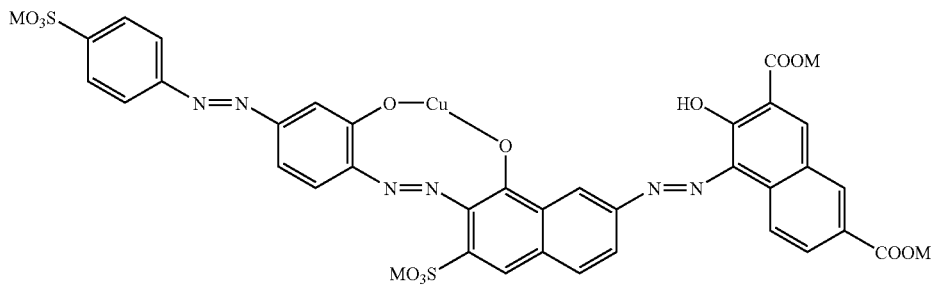
(5b)
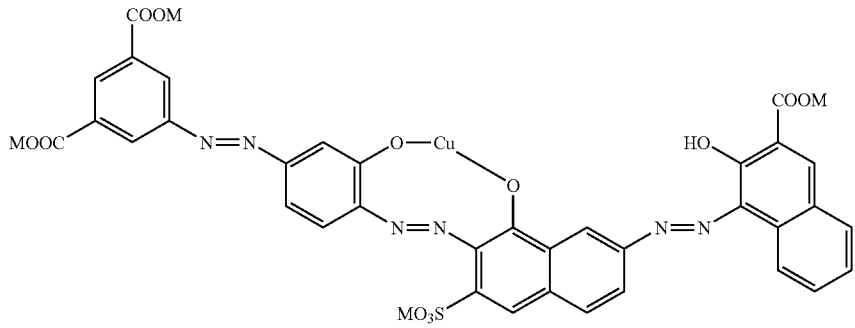
(5c)
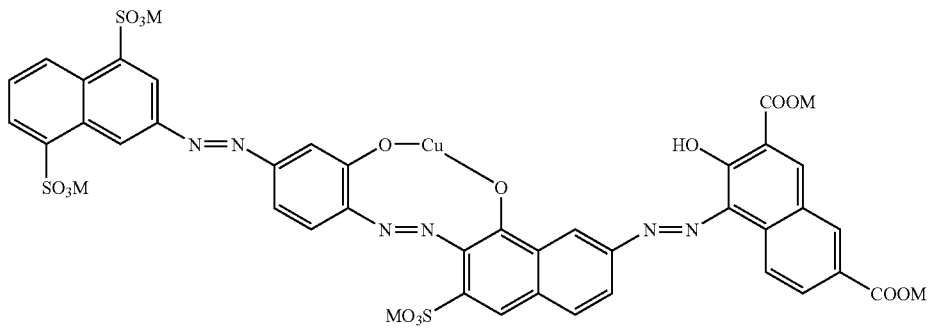
(5d)
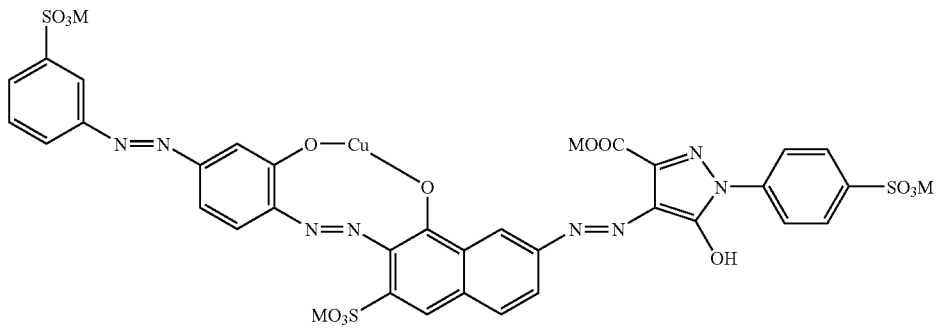
(5e)

-continued
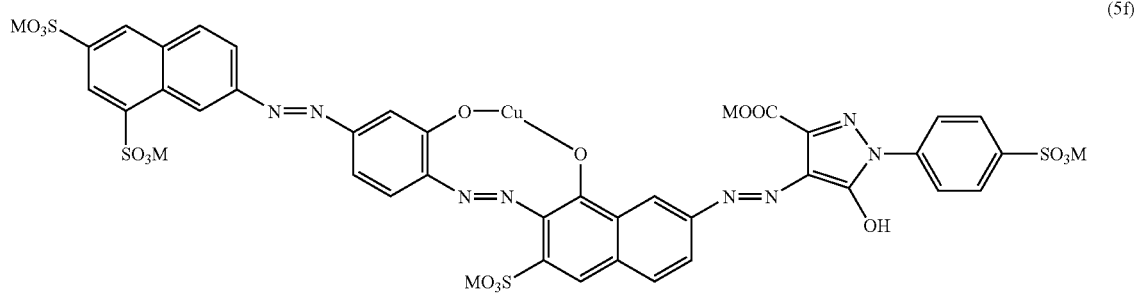
(5f)
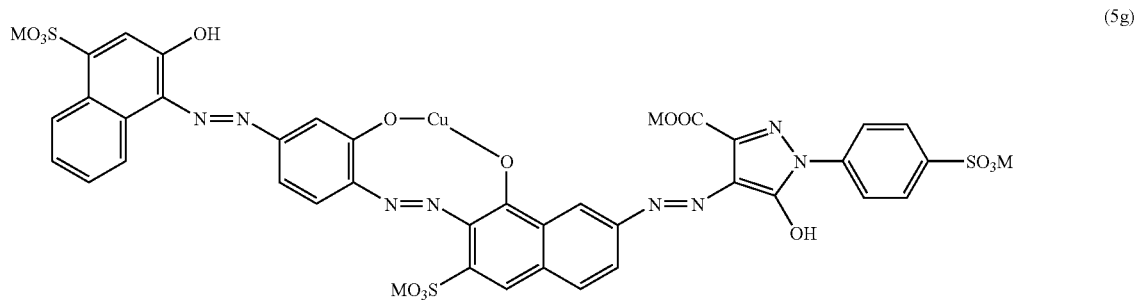
(5g)
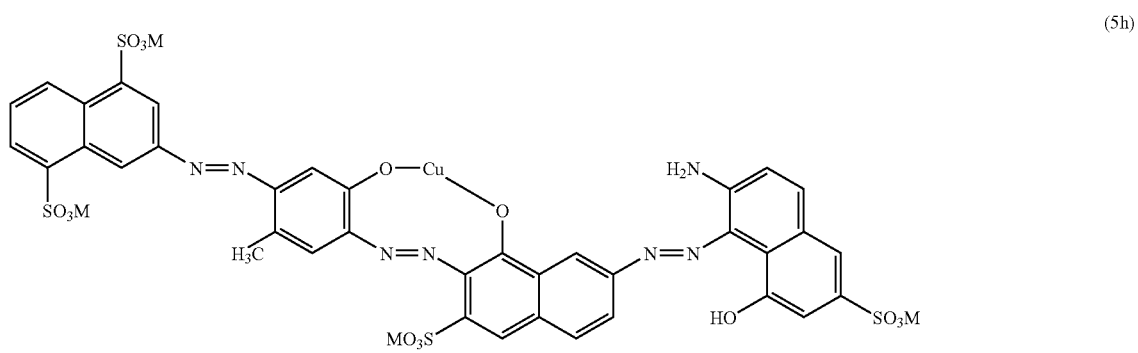
(5h)
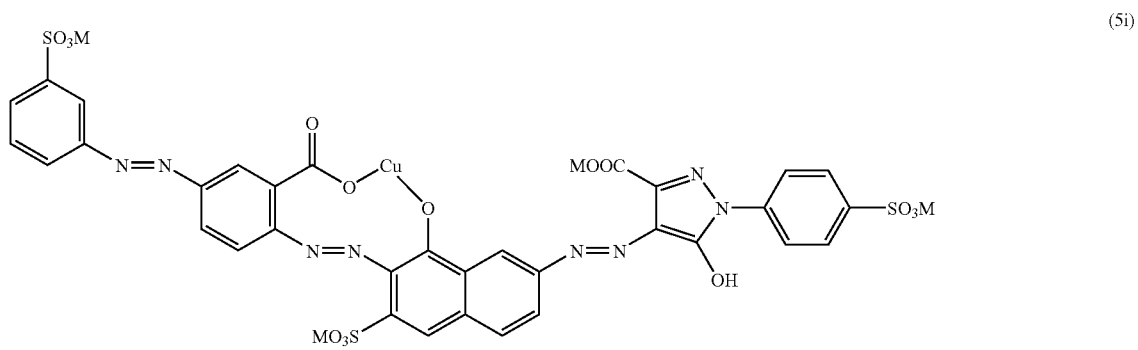
(5i)
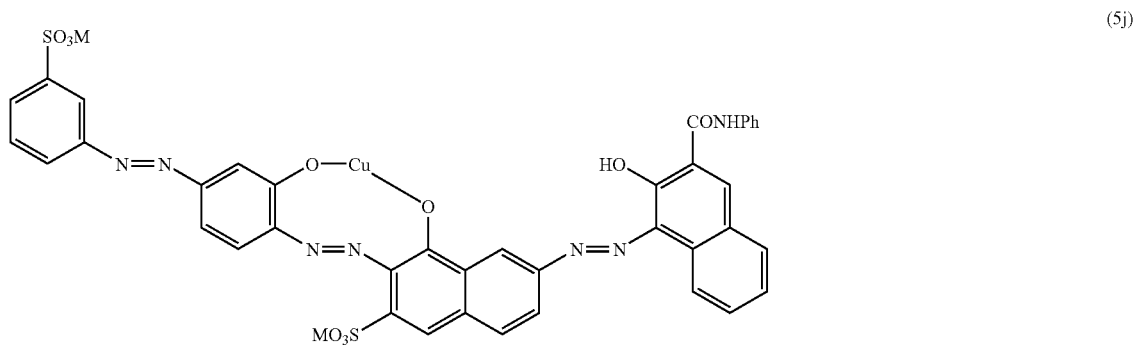
(5j)

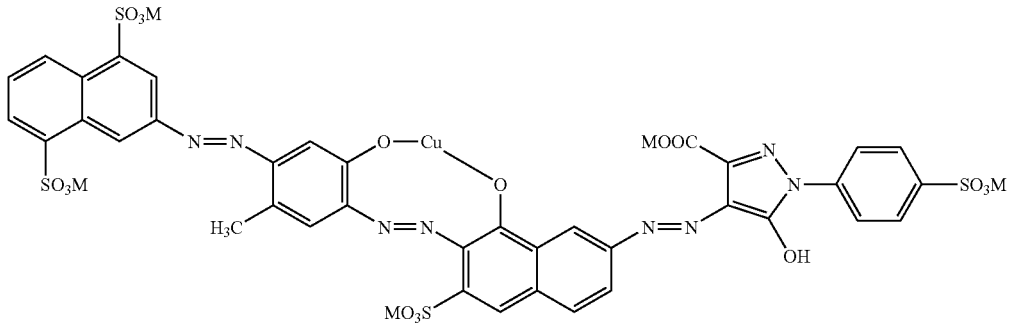
(5k)

In the dyes of the formulae (4) and (5b) to (5k) M is preferably sodium and/or hydrogen depending on pH.

In the mixtures, preferred proportions between the compounds of the formula (4) and (5), based on dry weights, are between 100:1 and 1:100, preferably between 50:1 and 1:50, in particular between 10:1 and 1:10.

The compound of the formula (4) with $SO_2R^1$ positioned meta to the azo bridge and with Y as H and also with $R^1$ as β-sulfatoethyl and M1 as Cu is known under the name C.I. Reactive Red 23.

The dye mixtures of the invention, depending on the dyes used, may further comprise a shading dye, preferably from the group consisting of the C.I. dyes Acid Yellow 17 and 23, C.I. Direct Yellow 86, 98 and 132, C.I. Reactive Yellow 37, C.I. Pigment Yellow 17, 74, 83, 97, 120, 139, 151, 155 and 180; C.I. Direct Red 1, 11, 37, 62, 75, 81, 87, 89, 95, 227; C.I. Acid Red 1, 8, 80, 81, 82, 87, 94, 115, 131, 144, 152, 154, 186, 245, 249 and 289; C.I. Reactive Red 21, 22, 23, 35, 63, 106, 107, 112, 113, 114, 126, 127, 128, 129, 130, 131, 137, 160, 161, 174, 180; C.I. Pigment Red 122, 176, 184, 185 and 269; C.I. Direct Blue 199, C.I. Acid Blue 9, and C.I. Pigment Blue 15:1–15:4. The shading dye is present preferably in an amount of from 0.001 to 5% by weight, in particular from 0.01 to 1% by weight, based on the dry weight of the overall dye mixture.

The dye mixtures of the invention may be prepared by mixing the dyes of the formulae (4) and (5) and, where used, the shading dye with one another in the stated proportions in the form of dry powders, their solutions, water-moist or solvent-moist presscakes and/or masterbatches.

The present invention further provides for the use of said mixtures for dyeing and printing natural and synthetic fiber materials (e.g., polyester, silk, wool, blends), particularly for recording text and images on different recording media, and also for dyeing paper or pulp in the mass.

For use in recording liquids, the dyes described are prepared in accordance with the stated requirements. The dyes may be isolated from the initial, preferably aqueous, reaction mixtures by salting out and filtering or by spray drying, where appropriate following partial or complete desalting by means of membrane filtration. Alternatively, the dye-containing reaction mixtures may be converted directly, without isolation, into concentrated dye solutions by adding organic and/or inorganic bases, possibly humectants, preservatives, where appropriate following partial or complete desalting by means of membrane filtration. As another alternative, the dyes may also be used in the form of presscakes (in flush processes where appropriate) or as powders. The dye mixtures of the invention are advantageously used in a form as far as possible free from salt, i.e., free from NaCl or other common inorganic salts formed during the synthesis of the dyes.

Examples of inorganic bases suitable for concentrated dye solutions include lithium hydroxide, lithium carbonate, sodium hydroxide, sodium hydrogen carbonate, sodium carbonate, potassium hydroxide, potassium carbonate and ammonia. Examples of suitable organic bases include monoethanolamine, diethanolamine, triethanolamine, 2-aminopropanol, 3-aminopropanol, dipropanolamine, tripropanolamine, N-methylaminoethanol, N,N-dimethylaminoethanol, N-phenyl-aminopropanol, ethylenediamine, tetramethylethylenediamine, tetramethyl-propylenediamine, tetramethylhexylenediamine, diethylenetriamine, triethylene-tetramine, triethylamine, diisopropylethylamine and polyethyleneimine.

Examples of humectants suitable for concentrated dye solutions are formamide, urea, tetramethylurea, ε-caprolactam, ethylene glycol, diethylene glycol, triethylene glycol, polyethylene glycol, butyl glycol, methyl cellosolve, glycerol, N-methyl-pyrrolidone, 1,3-diethyl-2-imidazolidinone, sodium xylolsulfonate, sodium cumenesulfonate and sodium butylmonoglycol sulfate.

The dye mixtures of the invention are especially suitable for preparing recording liquids, particularly water-based and nonaqueous inks for the inkjet printing process, and also for inks which operate in accordance with the hot melt process or are based on microemulsions, but also for other printing, reproducing, marking, writing, drawing, stamping or recording processes.

The invention further provides recording liquids which comprise a dye mixture of the invention and, where appropriate, other colorants for shading, as described above. Shading colorants of this kind are present appropriately in an amount from 0 to 20% by weight, preferably from 0.01 to 10% by weight, in particular from 0.1 to 5% by weight, based on the total weight of the recording liquid. The composition of the recording liquid must be adapted to the particular end use.

Recording liquids of the invention generally contain in total from 0.1 to 50% by weight of said mixture of the dyes (4) and (5), and where appropriate the shading colorants, calculated as dry weight, from 0 to 99% by weight of water and from 0.5 to 99.5% by weight of organic solvent and/or humectants. In one preferred embodiment the recording liquids contain from 0.5 to 15% by weight of said dye mixture, calculated as dry weight, from 35 to 75% by weight of water and from 10 to 50% by weight of organic solvent and/or humectants; in another preferred embodiment they contain from 0.5 to 15% by weight of said dye mixture, calculated as dry weight, from 0 to 20% by weight of water and from 70 to 99.5% by weight of organic solvent and/or humectants.

Water used for preparing the recording liquids is employed preferably in the form of distilled or deionized water. The solvents and/or humectants present in the recording liquids may comprise an organic solvent or a mixture of such solvents, water-miscible solvents being preferred. Examples of suitable solvents include monohydric or polyhydric alcohols, their ethers and esters, e.g., methanol, ethanol, propanol, isopropanol, butanol, isobutanol; dihydric or trihydric alcohols, particularly those having from 2 to 6 carbon atoms, e.g., ethylene glycol, propylene glycol, 1,3-propanediol, 1,4-butanediol, 1,5-pentanediol, 1,6-hexanediol, 1,2,6-hexanetriol, glycerol, diethylene glycol, dipropylene glycol, triethylene glycol, polyethylene glycol, tripropylene glycol, polypropylene glycol; lower alkyl ethers of polyhydric alcohols, such as ethylene glycol monomethyl, monoethyl or monobutyl ether, triethylene glycol monomethyl or monoethyl ether; ketones and ketone alcohols such as acetone, methyl ethyl ketone, diethyl ketone, methyl isobutyl ketone, methyl pentyl ketone, cyclopentanone, cyclohexanone, diacetone alcohol; amides, such as dimethylformamide, dimethylacetamide, N-methylpyrrolidone; and urea, tetramethylurea, thiodiglycol or ε-caprolactam.

Furthermore, the recording liquids of the invention may comprise further customary additives, examples being preservatives, cationic, anionic or nonionic surface-active substances (surfactants and wetting agents), and also viscosity regulators, e.g., polyvinyl alcohol, cellulose derivatives, or water-soluble natural or synthetic resins as film formers or binders for increasing the adhesive strength and abrasion resistance. It is also possible for light stabilizers to be present.

Moreover, amines, such as ethanolamine, diethanolamine, triethanolamine, N,N-dimethylethanolamine and diisopropylamine, may be present for the purpose of increasing the pH of the recording liquid, normally at from 0 to 10% by weight, preferably from 0.5 to 5% by weight, based on the total weight of the recording liquid.

Depending on the embodiment of the inkjet printing process as, e.g., a continuous jet, intermittent jet, impulse jet or compound jet process, further additives may be added to the recording liquids for said printing process, for the purpose, for example, of buffering of the pH or of adjusting the electrical conductivity, specific heat, thermal expansion coefficient, and conductivity.

The storage of recording liquids of the invention is not accompanied by any deposition of precipitates leading to poorly defined printed images or nozzle blockage.

In terms of viscosity and surface tension, the recording liquids of the invention are situated within the ranges appropriate for inkjet processes. They give printed images of high optical density with excellent light fastness and water fastness.

The dye mixture of the invention may further be used as an ink set in combination with magenta, yellow and/or cyan dyes. For the magenta, yellow, and cyan shades, the colorants involved comprise both dyes, such as the C.I. dyes Acid Yellow 17, C.I. Acid Yellow 23, C.I. Direct Yellow 86, C.I. Direct Yellow 98, C.I. Direct Yellow 132, C.I. Reactive Yellow 37, C.I. Reactive Red 23, C.I. Reactive Red 180, C.I. Acid Red 52, C.I. Acid Blue 9, C.I. Direct Blue 199, and pigments, such as C.I. Pigment Yellow 17, C.I. Pigment Yellow 74, C.I. Pigment Yellow 83, C.I. Pigment Yellow 97, C.I. Pigment Yellow 120, C.I. Pigment Yellow 139, C.I. Pigment Yellow 151, C.I. Pigment Yellow 155, C.I. Pigment Yellow 180, C.I. Pigment Red 122, C.I. Pigment Red 176, C.I. Pigment Red 184, C.I. Pigment Red 185 and C.I. Pigment Red 269, C.I. Pigment Violet 19, C.I. Pigment Blue 15, C.I. Pigment Blue 15:3, and C.I. Pigment Blue 15:4.

The dye mixtures of the invention are further suitable as colorants in electro-photographic toners and developers, such as one- and two-component powder toners, magnetic toners, liquid toners, polymerization toners, and other, specialty toners, for example.

Typical toner binders are addition polymerization, polyaddition, and polycondensation resins, such as styrene, styrene acrylic, styrene butadiene, acrylic, polyester, and phenol-epoxy resins, polysulfones, polyurethanes, individually or in combination, and also polyethylene and polypropylene, which may also contain further ingredients, such as charge control agents, waxes or flow aids, or may have these substances added subsequently.

The dye mixtures of the invention are further suitable as colorants in powders and powder coating materials, especially in powder coating materials which are sprayed triboelectrically or electrostatically and are used to coat the surfaces of articles made, for example, from metal, wood, plastic, glass, ceramic, concrete, textile material, paper or rubber.

Typical powder coating resins used include epoxy resin, carboxyl- and hydroxyl-containing polyester resins, polyurethane resins, and acrylic resins, together with customary hardeners. Resin combinations are also used. For example, epoxy resins are frequently used in combination with carboxyl- and hydroxyl-containing polyester resins.

Moreover, the dye mixtures of the invention are suitable as colorants for color filters, both for additive and for subtractive color generation (P. Gregory "Topics in Applied Chemistry: High Technology Applications of Organic Colorants" Plenum Press, New York 1991, pages 15–25), and also as colorants in electronic inks for what are known as electronic newspapers.

In the fields of use described above as well the dye mixtures of the invention may additionally be shaded with other dyes and/or pigments, such as with C.I. Acid Yellow 17 and 23, C.I. Direct Yellow 86, 98 and 132, C.I. Reactive Yellow 37, C.I. Pigment Yellow 17, 74, 83, 97, 120, 139, 151, 155 and 180, C.I. Direct Red 1, 11, 37, 62, 75, 81, 87, 89, 95, 227; C.I. Acid Red 1, 8, 87, 94, 115, 131, 144, 152, 154, 186, 245, 249 and 289; C.I. Reactive Red 21, 22, 23, 35, 63, 106, 107, 112, 113, 114, 126, 127, 128, 129, 130, 131, 137, 160, 161, 174, 180; C.I. Pigment Red 122, 176, 184, 185 and 269; C.I. Acid Blue 9, C.I. Direct Blue 199, C.I. Pigment Violet 19, and C.I. Pigment Blue 15, 15:3, 15:4.

In the examples below relating to the preparation of recording liquids the light fastness is determined in accordance with DIN 54003 (blue wool scale). On this scale, 1 means very low, 2 low, 3 moderate, 4 fairly good, 5 good, and 6 very good.

Further, in the dyes used, M is defined as hydrogen and/or sodium (depending on pH) and in the dye of the formula (4) M1 is Cu.

EXAMPLE 1

In each case a 10% by weight salt-free aqueous solution of the dye of the formula (4) (where $R^1=CH_2CH_2NR^3R^4$, $R^3=H$, $R^4=CH_2CO_2M$ and $Y=H$; $SO_2R^1$ is meta to the azo bridge) and of the formula (5k) is prepared.

Then, at room temperature, 500 ml of the dye solution (4) are mixed with 4 500 ml of the dye solution (5k). The resulting dye solution is preserved using 11 g of ®Proxel GXL.
Absorption spectrum in water: $\lambda_{max}$=420/602 nm;
light fastness: 5 (blue wool scale);
storage stability test: no particulate solids after 6 weeks at 50° C. and 10 days at −20° C. (after cooling/thawing to room temperature in each case).
Surface tension: >50 mN/m (4% aqueous ink).

EXAMPLE 2

200 ml of a 10% by weight salt-free solution of the dye of the formula (4) (where $R^1$=CH$_2$CH$_2$NR$^3$R$^4$, $R^3$=H, $R^4$=CH$_2$CH$_2$SO$_3$M and Y=H; SO$_2$R$^1$ is meta to the azo bridge) are mixed with 1 800 ml of a likewise desalted 10% by weight solution of (5k). In order to preserve the colorant solution, 0.2% by volume of ®Mergal K10 N is added.
Absorption spectrum in water: $\lambda_{max}$=428/606 nm;
light fastness: 5;
storage stability: no particulate solids after 6 weeks at 50° C. and 10 days at −20° C. (after cooling/thawing at room temperature in each case).
Surface tension: >50 mN/m (4% aqueous ink).

EXAMPLE 3

100 ml of a 10% by weight salt-free solution of the dye of the formula (4) (where $R^1$=CH$_2$CH$_2$NR$^3$R$^4$, $R^3$=H, $R^4$=CH$_2$CH$_2$OM and Y=H; SO$_2$R$^1$ is meta to the azo bridge) are admixed with 1 000 ml of a likewise desalted 10% by weight solution of (5k). The pH of the solution is adjusted to 6.5–8.5. The dye solution is preserved using 0.2% by volume of ®Proxel GXL.
Absorption spectrum in water: $\lambda_{max}$=420/600 nm;
light fastness: 5;
storage stability: no particulate solids after 4 weeks at 50° C. and 10 days at −20° C. (after cooling/thawing at room temperature in each case).
Surface tension: >50 mN/m (4% aqueous ink).

EXAMPLE 4

In each case a 10% by weight salt-free aqueous solution of the dye of the formula (4) (where $R^1$=CH$_2$CH$_2$NR$^3$R$^4$, $R^3$=H, $R^4$=CH$_2$CO$_2$M and Y=H; SO$_2$R$^1$ is meta to the azo bridge) and of the formula (5f) is prepared.
Then, at room temperature, 500 ml of the dye solution (4) are mixed with 4 500 ml of the dye solution (5f). The resulting dye solution is preserved using 11 g of ®Proxel GXL.
Absorption spectrum in water: $\lambda_{max}$=425/590 nm;
light fastness: 5 (blue wool scale);
storage stability test: no particulate solids after 6 weeks at 50° C. and 10 days at −20° C. (after cooling/thawing to room temperature in each case);
surface tension: >50 mN/m (4% aqueous ink).

EXAMPLE 5

200 ml of a 10% by weight salt-free solution of the dye of the formula (4) (where $R^1$=CH$_2$CH$_2$NR$^3$R$^4$, $R^3$=H, $R^4$=CH$_2$CH$_2$SO$_3$M and Y=H; SO$_2$R$^1$ is meta to the azo bridge) are mixed with 1 800 ml of a likewise desalted 10% by weight solution of (5f). In order to preserve the colorant solution, 0.2% by volume of ®Mergal K10 N is added.
Absorption spectrum in water: $\lambda_{max}$=422/586 nm;
light fastness: 5;
storage stability: no particulate solids after 6 weeks at 50° C. and 10 days at −20° C. (after cooling/thawing at room temperature in each case).
Surface tension: >50 mN/m (4% aqueous ink).

EXAMPLE 6

100 ml of a 10% by weight salt-free solution of the dye of the formula (4) (where $R^1$=CH$_2$CH$_2$NR$^3$R$^4$, $R^3$=H, $R^4$=CH$_2$CH$_2$OM and Y=H; SO$_2$R$^1$ is meta to the azo bridge) are admixed with 1 000 ml of a likewise desalted 10% by weight solution of (5f). The pH of the solution is adjusted to 6.5–8.5. The dye solution is preserved using 0.2% by volume of ®Proxel GXL.
Absorption spectrum in water: $\lambda_{max}$=417/598 nm;
light fastness: 5;
storage stability: no particulate solids after 4 weeks at 50° C. and 10 days at −20° C. cooling/thawing at room temperature in each case).
Surface tension: >50 mN/m (4% aqueous ink).

EXAMPLE 7

200 ml of a 10% by weight salt-free solution of the dye of the formula (4) (where $R^1$=CH$_2$CH$_2$NR$^3$R$^4$, $R^3$=H, $R^4$=CH$_2$CH$_2$M and Y=H; SO$_2$R$^1$ is meta to the azo bridge) are mixed with 2 000 ml of a likewise desalted 10% by weight solution of (5f). In order to preserve the colorant solution, 0.2% by volume of ®Mergal K10 N is added.
Absorption spectrum in water: $\lambda_{max}$=426/588 nm;
light fastness: 5;
storage stability: no particulate solids after 6 weeks at 50° C. and 10 days at −20° C. (after cooling/thawing at room temperature in each case).
Surface tension: >50 mN/m (4% aqueous ink).

EXAMPLE 8

200 ml of a 10% by weight salt-free solution of the dye of the formula (4) (where $R^1$=CH$_2$CH$_2$NR$^3$R$^4$, $R^3$=H, $R^4$=CH$_2$CH$_2$M and Y=H; SO$_2$R$^1$ is meta to the azo bridge) are mixed with 1 800 ml of a likewise desalted 10% by weight solution of (5f). In addition, 20 ml of a 10% by weight salt-free C.I. Acid Red 52 solution are added. In order to preserve the colorant solution, 0.2% by volume of ®Mergal K10 N is added.
Absorption spectrum in water: $\lambda_{max}$=438/582 nm;
light fastness: 5;
storage stability: no particulate solids after 6 weeks at 50° C. and 10 days at −20° C. (after cooling/thawing at room temperature in each case).
Surface tension: >50 mN/m (4% aqueous ink).

EXAMPLE 9

200 ml of a 10% by weight salt-free solution of the dye of the formula (4) (where $R^1$=CH$_2$CH$_2$OSO$_3$M and Y=H; SO$_2$R$^1$ is meta to the azo bridge) are mixed with 2 000 ml of a likewise desalted 10% by weight solution of (5f). In order to preserve the colorant solution, 0.2% by volume of ®Proxel GXL is added.
Absorption spectrum in water: $\lambda_{max}$=419/593 nm;
light fastness: 5;

storage stability: no particulate solids after 6 weeks at 50° C. and 10 days at −20° C. (after cooling/thawing at room temperature in each case).

Surface tension: >50 mN/m (4% aqueous ink).

EXAMPLE 10

100 ml of a 10% by weight salt-free solution of the dye of the formula (4) (where $R^1=CH_2CH_2NR^3R^4$, $R^3=H$, $R^4=CH_2CH_2OM$ and Y=H; $SO_2R^1$ is meta to the azo bridge) are admixed with 1 000 ml of a likewise desalted 10% by weight solution of (5e). The pH of the solution is adjusted to 6.5–8.5. The dye solution is preserved using 0.15% by volume of ®Proxel GXL.

Absorption spectrum in water: $\lambda_{max}$=410/592 nm;
light fastness: 5;
storage stability: no particulate solids after 4 weeks at 50° C. and 10 days at −20° C. (after cooling/thawing at room temperature in each case).
Surface tension: >50 mN/m (4% aqueous ink).

The invention claimed is:

1. A dye mixture consisting essentially of one or more dyes of the formula (4) and one or more dyes of the formula (5)

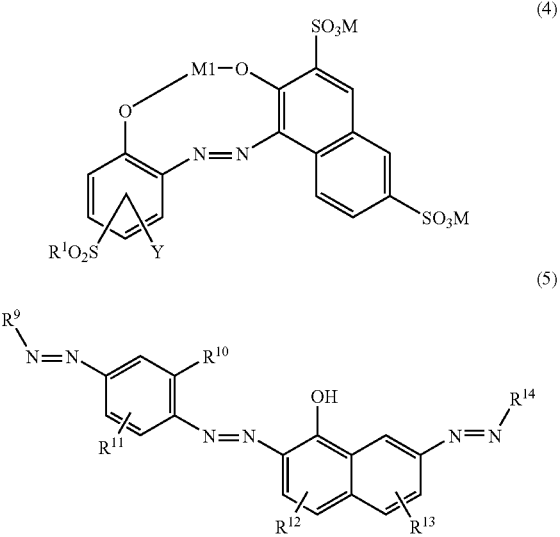

in which

Y is H, $(C_1-C_6)$-alkyl, $(C_1-C_6)$-alkoxy or halogen;

$R^1$ is OM, CH=CH$_2$, $CH_2CH_2OR^2$, $CH_2CH_2NR^3R^4$, $CH_2CH_2SR^5$ or $CH_2CH_2CR^6R^7R^8$, $R^2$ is H, SO$_3$M, $(C_1-C_6)$-alkyl, $(C_1-C_6)$-alkyl substituted by one or more radicals from the group consisting of OH, NH$_2$, COOM and SO$_3$M; $(C_1-C_6)$-acyl, $(C_6-C_{10})$-aryl, $(C_6-C_{10})$-aryl substituted by one or more radicals selected from the group consisting of halogen, OH, NH$_2$, COOM and SO$_3$M; or 5–10-membered heterocycles containing from 1 to 4 heteroatoms from the group consisting of O, N and S;

$R^3$ and $R^4$ independently of one another are H, $(C_1-C_6)$-alkyl, $(C_1-C_6)$-alkyl substituted by one or more radicals from the group consisting of OH, NH$_2$, COOM and SO$_3$M; $(C_1-C_6)$-acyl, $(C_6-C_{10})$-aryl, $(C_6-C_{10})$-aryl substituted by one or more radicals from the group consisting of OH, halogen, NH$_2$, COOM and SO$_3$M; or NR$^3$R$^4$ forms a heterocycle;

$R^5$ is $(C_1-C_6)$-alkyl, $(C_1-C_6)$-alkyl substituted by one or more radicals selected from the group consisting of OH, NH$_2$, COOM and SO$_3$M; $(C_1-C_6)$-acyl, $(C_6-C_{10})$-aryl, $(C_6-C_{10})$-aryl substituted by one or more radicals selected from the group consisting of OH, halogen, NH$_2$, COOM and SO$_3$M, or SR$^5$ forms a heterocycle;

$R^6$, $R^7$, and $R^8$ independently of one another are H, $(C_1-C_6)$-alkyl, or $(C_1-C_6)$-alkyl substituted by one or more radicals selected from the group consisting of halogen, OM, NH$_2$, COOCH$_3$, COOM and SO$_3$M; or one or two of the radicals $R^6$, $R^7$, and $R^8$ is or are COOM;

$R^9$ is a $(C_6-C_{14})$-aryl radical substituted one or more times by OM, O($C_1-C_6$)-alkyl, O($C_1-C_6$)-alkyl-COOM, O($C_1-C_6$)-alkyl-SO$_3$M, O(hydroxy($C_1-C_6$)-alkyl), ($C_1-C_6$)-alkyl, COOM, SO$_3$M, SO$_2$NH$_2$, SO$_2$N(hydroxy($C_1-C_6$)-alkyl)$_2$, SO$_2$NH($C_1-C_6$)-alkyl, SO$_2$N(($C_1-C_6$)-alkyl)$_2$, NH$_2$, NH($C_1-C_6$)-alkyl, NH($C_1-C_6$)-acyl, NH($C_6-C_{10}$)-aryl, N(hydroxy($C_1-C_6$)-alkyl)$_2$, N(($C_1-C_6$)-alkyl)$_2$ and/or halogen;

$R^{10}$ is OM, O($C_1-C_6$)-alkyl, COOM, SO$_3$M, COO($C_1-C_6$-alkyl) or SO$_3$($C_1-C_6$-alkyl);

$R^{11}$, $R^{12}$, and $R^{13}$ are identical or different and are H, OM, O($C_1-C_6$)-alkyl, O($C_1-C_6$)-alkyl-COOM, O($C_1-C_6$)-alkyl-SO$_3$M, O(hydroxy($C_1-C_6$)-alkyl), ($C_1-C_6$)-alkyl, COOM, SO$_3$M, SO$_2$NH$_2$, SO$_2$N(hydroxy($C_1-C_6$)-alkyl)$_2$, SO$_2$NH($C_1-C_6$)-alkyl, SO$_2$N(($C_1-C_6$)-alkyl)$_2$, NH$_2$, NH($C_1-C_6$)-alkyl, NHacyl, NH($C_6-C_{14}$)-aryl, N(hydroxy($C_1-C_6$)-alkyl)$_2$, N(($C_1-C_6$)-alkyl)$_2$, or halogen, $R^{14}$ is a monocyclic or bicyclic, carbocyclic or heterocyclic, aromatic or aliphatic ring which is unsubstituted or substituted one or more times by OM, ($C_1-C_6$)-alkyl, O($C_1-C_6$)-alkyl-COOM, O($C_1-C_6$)-alkyl-SO$_3$M, O(hydroxy($C_1-C_6$)-alkyl), ($C_1-C_6$)-alkyl, COOM, SO$_3$M, SO$_2$NH$_2$, CONH-phenyl, SO$_2$NH-phenyl, SO$_2$N(hydroxy($C_1-C_6$)-alkyl)$_2$, SO$_2$NH($C_1-C_6$)-alkyl, SO$_2$N(($C_1-C_6$)-alkyl)$_2$, NH$_2$, NH($C_1-C_6$)-alkyl, NH($C_1-C_6$)-acyl, NH($C_6-C_{10}$)-aryl, N(hydroxy($C_1-C_6$)-alkyl)$_2$, N(($C_1-C_6$)-alkyl)$_2$, halogen and/or phenylsulfo and can contain 1, 2 or 3 of the heteroatoms N, O and/or S in the ring;

M1 stands for a monovalent or polyvalent metal atom, and

M is hydrogen, a monovalent metal cation, one equivalent to a polyvalent metal cation, or an ammonium ion unsubstituted or substituted by $(C_1-C_4)$-alkyl, $(C_1-C_4)$-alkoxy-$(C_1-C_4)$-alkyl, hydroxy-$(C_1-C_4)$-alkyl, benzyl or $(C_6-C_{10})$-aryl.

2. The dye mixture as claimed in claim 1, wherein $R^2$ is hydrogen, SO$_3$M, methyl, ethyl, acetyl, phenyl, chlorophenyl, phenylsulfonic acid, morpholinyl or pyridinyl.

3. The dye mixture as claimed in claim 1, wherein $R^3$ and $R^4$ are hydrogen, methyl, ethyl, hydroxymethyl, hydroxypropyl, acetyl, phenyl, chlorophenyl, phenylsulfonic acid, CH$_2$CH$_2$OM, CH$_2$CH$_2$SO$_3$M, CH$_2$COOH, CH$_2$CH$_2$COOM or CH$_3$CHCOOM.

4. The dye mixture as claimed in 1, wherein the dye of the formula (5) is a compound of the formula (5a)

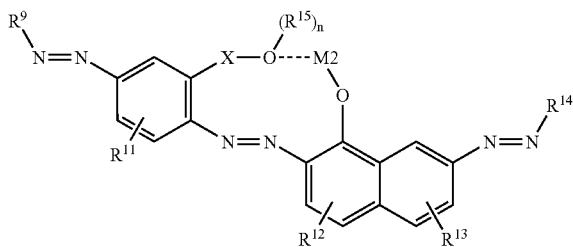

where
- M2 is ⅔ Al, Cr, Fe, Co, Ni or Cu,
- $R^{15}$ is $C_1$–$C_6$-alkyl,
- n is 0 or 1,
- X is a chemical bond, —CO— or —$SO_2$—,
- $R^9$ is a phenyl or naphthyl radical substituted 1, 2 or 3 times by OH, O($C_1$–$C_6$)-alkyl, COOM, $SO_3M$ and/or $NH_2$,
- $R^{11}$ is H, methyl or O($C_1$–$C_6$)-alkyl,
- $R^{12}$ and $R^{13}$ are H, COOM or $SO_3M$,
- $R^{14}$ is a phenyl, naphthyl, pyridyl, pyridonyl or pyrazolyl radical substituted 1, 2 or 3 times by OH, O($C_1$–$C_6$)-alkyl, COOM, $SO_3M$, $NH_2$, NH($C_6$–$C_{10}$)-aryl, NH($C_1$–$C_6$)-acyl and/or phenylsulfo, and
- M is H, Na, K, Li, Ca/2 or ammonium.

5. The dye mixture as claimed in 1, wherein the proportion between the dyes of the formula (4) and (5), based on dry weights, is from 100:1 to 1:100.

6. The dye mixture as claimed in claim 1, further comprising a shading colorant from the group consisting of C.I. Acid Yellow 17, 23, C.I. Direct Yellow 86, 98, 132, C.I. Reactive Yellow 37, C.I. Pigment Yellow 17, 74, 83, 97, 120, 139, 151, 155 and 180, C.I. Direct Red 1, 11, 37, 62, 75, 81, 87, 89, 95, 227; C.I. Acid Red 1, 8, 87, 94, 115, 131, 144, 152, 154, 186, 245, 249, 289; C.I. Reactive Red 21, 22, 23, 35, 63, 106, 107, 112, 113, 114, 126, 127, 128, 129, 130, 131, 137, 160, 161, 174, 180; C.I. Pigment Red 122, 176, 184, 185, 269; C.I. Acid Blue 9, C.I. Direct Blue 199, C.I. Pigment Violet 19, and C.I. Pigment Blue 15, 15:3, 15:4.

7. A process for preparing a dye mixture as claimed in claim 1, comprising mixing the dyes of the formulae (4) and (5).

8. A dyed natural or synthetic fiber material comprising the dye mixture as claimed in claim 1.

9. A recording liquid comprising a dye mixture as claimed in claim 1.

10. The recording liquid as claimed in claim 9, further comprising water and at least one compound selected from the group consisting of organic solvents and humectants.

11. An inkjet ink comprising the recording liquid as claimed in claim 9.

12. An ink set consisting of at least one magenta-colored recording liquid, a yellow recording liquid, a cyan-colored recording liquid, and a black recording liquid as claimed in claim 9.

13. The dye mixture as claimed in claim 1, wherein the proportion between the dyes of the formula (4) and (5), based on dry weights is from 10:1 to 1:10.

14. The process as claimed in claim 7, wherein the mixing step further comprises mixing a shading colorant with the dyes of the formulae (4) and (5) to form a dye mixture.

15. The process as claimed in claim 14, further comprising forming the dye mixture in a dry powder, solution water moist presscakes, solvent moist presscakes or masterbatch.

16. A recording medium comprising the dye mixture as claimed in claim 1.

17. The recording liquid as claimed in claim 10, consisting of from 0.1 to 50% by weight of the dye mixture, calculated as dry weight, from 0 to 99% by weight of water and from 0.5 to 99.5% by weight of the at least one compound.

18. A method dyeing paper or pulp comprising the step of dyeing the paper or pulp with the dye mixture as claimed in claim 1.

19. An ink set comprising at least one magenta-colored recording liquid, a yellow recording liquid, a cyan-colored recording liquid, and a black recording liquid as claimed in claim 9.

* * * * *